United States Patent [19]

Kishi et al.

[11] Patent Number: 4,755,927
[45] Date of Patent: Jul. 5, 1988

[54] METHOD AND APPARATUS FOR PRODUCING A THREE-DIMENSIONAL CURVED SURFACE FROM TWO-DIMENSIONAL SECTION CURVES

[75] Inventors: Hajimu Kishi; Masaki Seki, both of Tokyo, Japan

[73] Assignee: Fanuc Ltd., Minamitsuru, Japan

[21] Appl. No.: 711,579

[22] PCT Filed: Jul. 7, 1984

[86] PCT No.: PCT/JP84/00348
§ 371 Date: Mar. 6, 1985
§ 102(e) Date: Mar. 6, 1985

[87] PCT Pub. No.: WO85/00444
PCT Pub. Date: Jan. 31, 1985

[30] Foreign Application Priority Data

Jul. 7, 1983 [JP] Japan .................... 58-123600

[51] Int. Cl.[4] .................... G06F 15/46; G05B 19/18
[52] U.S. Cl. .................... 364/191; 364/474; 318/568
[58] Field of Search .................... 364/167–169, 364/191, 194, 520–522, 200 MS File, 900 MS File, 474; 318/567–570, 574

[56] References Cited

U.S. PATENT DOCUMENTS

| | | | |
|---|---|---|---|
| 4,150,329 | 4/1979 | Dahlstrom | 318/574 |
| 4,393,450 | 7/1983 | Jerrard | 364/520 X |
| 4,491,906 | 1/1985 | Kishi et al. | 364/191 |
| 4,507,738 | 3/1985 | Nozawa et al. | 364/474 |
| 4,523,270 | 6/1985 | Kishi et al. | 364/191 |
| 4,569,014 | 2/1986 | Kishi et al. | 364/191 |

Primary Examiner—Gary V. Harkcom
Attorney, Agent, or Firm—Staas & Halsey

[57] ABSTRACT

The method involves entering section data relating to two sections (11, 12) of a three-dimensional curved body, data relating to first and second section curves (11a, 12a) formed by the two sections (11, 12), and data relating to a three-dimensional curve (31a) which contains points ($P_1$, $P_1'$) on the first and second section curves, and which specifies the external shape of the three-dimensional curved body. An intermediate section (41) is generated for each and every one of partition points ($S_i$) (i = 1, 2, 3 ...) that partition the three-dimensional curve (31a) into a multiplicity of line elements, the intermediate section containing the respective partition point. An intermediate section curve (41a) in the intermediate section is calculated by using the data relating to the two section curves (11a, 12a) and position information indicative of the partition points ($S_i$), and a curved surface of a three-dimensional curved body is created by the intermediate section curves.

7 Claims, 7 Drawing Sheets

METHOD AND APPARATUS FOR PRODUCING A THREE-DIMENSIONAL CURVED SURFACE FROM TWO-DIMENSIONAL SECTION CURVES

Cross Reference to Related Application

This application is related to pending U.S. application Ser. No. 711,578.

BACKGROUND OF THE INVENTION

This invention relates to a method of creating a curved surface of a three-dimensional curved body and, more particularly, to curved surface creation method that is ideal for the creation of an NC tape required for the numerically controlled machining of a three-dimensional metal mold or the like.

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, the applicant has proposed in U.S. Ser. No 266,284 now U.S. Pat. Nos. 4,491,906 and 4,596,014 see Japanese Patent Application No. 55-78247) a method of creating curved surfaces of a three-dimensional curved body, comprising generating a plurality of intermediate sections and finding respective section curves (intermediate section curves) of the curved body, based on the intermediate sections, in accordance with predetermined rules, from section data specifying given sections of the three-dimensional curved body and from data specifying section curves in said sections, and generating the curved surface of the three-dimensional body based on the plurality of the generated intermediate section curves. This prior-art method will be described with reference to FIG. 1. The method includes giving section curves 11a, 12a in two sections 11, 12 and a reference curve 21a in a reference section 21, moving the first section curve 11a of the two given section curves 11a, 12a along the reference curve 21a while the curve is being transformed so as to be superposed on the second section curve 12a, and creating a curved surface, which is formed owing to said movement, as an assemblage of a plurality of intermediate section curves. In generating the intermediate section curves, the first and second section curves 11a, 12a are brought into uniform correspondence with each other in their entirety. Specifically, when each of the section curves is partitioned into M segments, the i-th (i=1, 2, . . . ) partition points $P_i$, $Q_i$ of the respective curves are made to correspond to each other and each of the intermediate sections curves is generated by using the corresponding relation.

However, since the prior-art method is adapted to generate a curved surface by giving the reference curve 21a in the reference section (a plane), curved surface generation cannot be performed in a case where a reference curve is a three-dimensional curve that does not lie on a plane.

SUMMARY OF THE INVENTION

Accordingly, an object of the present invention is to provide a curved surface creation method whereby a curved surface can be created even if a reference curve is a three-dimensional curve that does not lie on a plane.

A method of creating a curved body according to the present invention has steps of entering section data relating to two sections of a three-dimensional curved body, data relating to first and second section curves formed by the two sections, and data relating to a three-dimensional curve which contains points $P_1$, $P_1'$ on the first and second section curves, and which specifies the external shape of the three-dimensional curved body, generating an intermediate section for each and every one of partition points that partition the three-dimensional curve into a multiplicity of line elements, the intermediate section containing the respective partition point, calculating an intermediate section curve in the intermediate section by using the section curve data of the two sections and position information indicative of the partition points, and creating a three-dimensional curved surface by a plurality of intermediate section curves.

DESCRIPTION OF THE PREFERRED EMBODIMENTS

Figure 1:
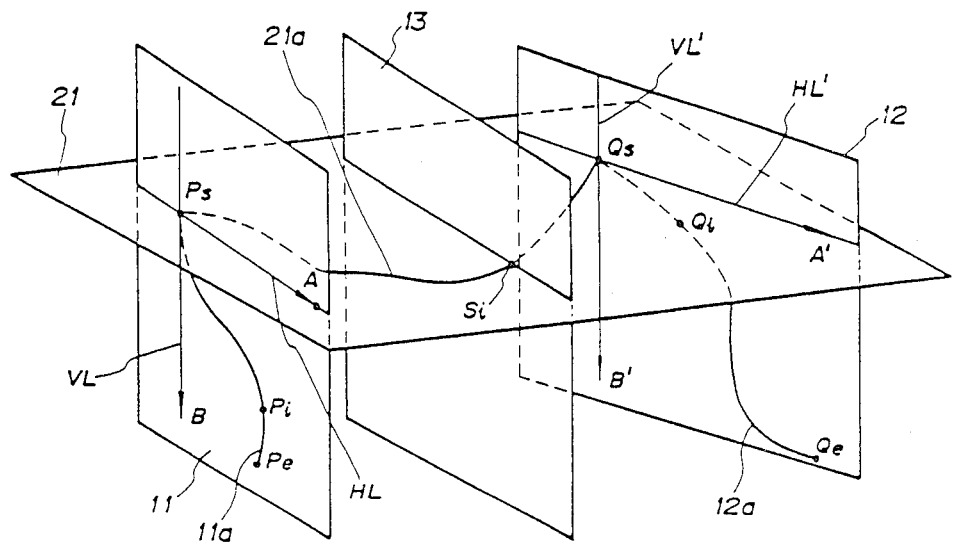
FIG. 1 is a view for describing the prior-art method.
Figure 2:
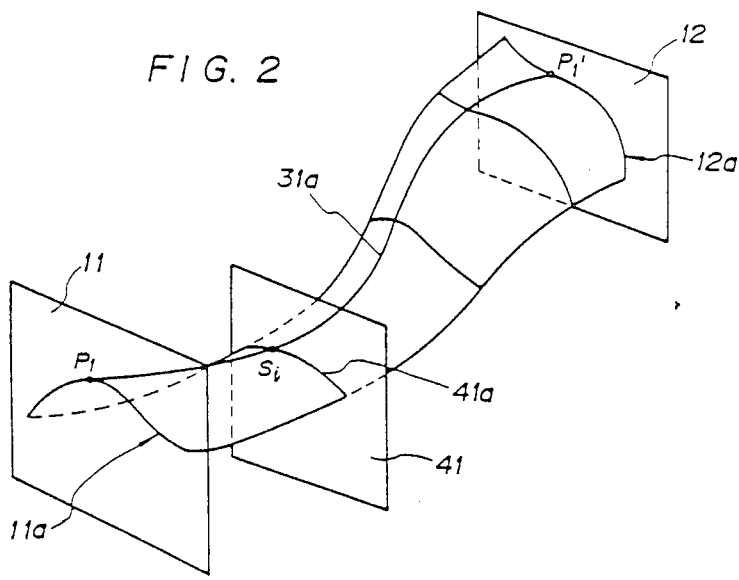
FIG. 2 is a schematic view of the present invention.

Processing for creating a curved surface according to the present invention is broadly classified into the following five processes (A)–(E):

(A) processing for specifying and entering the three-dimensional curve 31a (FIG. 2);

(B) processing for entering data relating to the sections 11, 12 and section curves 11a, 12a;

(C) processing for generating an intermediate section 41;

(D) processing for generating an intermediate section curve 41a; and (E) processing for repeating steps (C) and (D). Each of the processes (A) through (E) will now be described in detail.

(A) Processing for specifying a three-dimensional curve

Figure 3:
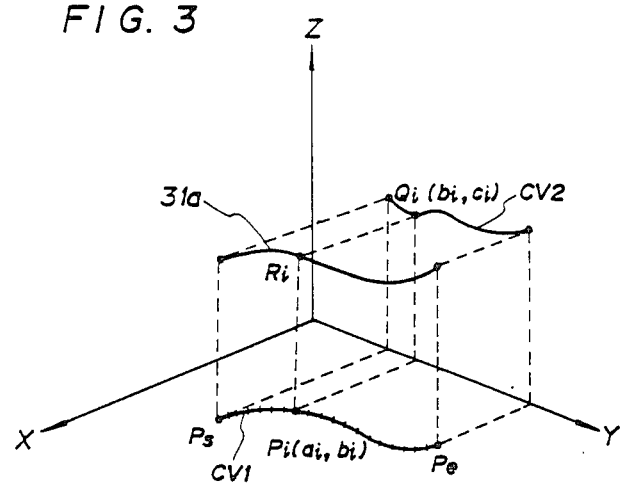
FIG. 3 is a view for describing a method of specifying a three-dimensional curve.

Processing for specifying a three-dimensional curve is constituted by the following four processes (a)–(d), with reference being had to FIG. 3:

(a) projection curve data input processing for projecting the three-dimensional curve 31a onto two mutually adjacent planes (e.g., an X-Y plane and a Y-Z plane) in a rectangular coordinate system, and for entering a first projection curve (referred to as a first curve) $CV_1$ and a second projection curve (referred to as a second curve) $CV_2$ comprising the projections, each of the curves being approximated by straight lines and circular arcs;

(b) partition point processing for successively partitioning the first curve $CV_1$ from a starting point $P_s$ to an end point $P_e$ by a separately entered partitioning pitch, and for finding coordinate values $(a_i, b_i)$ of each partition point $P_i$;

(c) processing for finding coordinate values $(b_i, c_i)$ of a point $Q_i$ on the second curve $CV_2$ having a partition point coordinate value $b_i$ on a common axis (Y axis) from among the coordinate axes of the two adjacent planes; and (d) processing for storing a point $R_i$ $(a_i, b_i, c_i)$ $(i=1, 2, 3, \ldots)$ on the three-dimensional curve $31a$ to specify the three-dimensional curve.

Processing for specifying a three-dimensional curve will now be described in conjunction with FIG. 3, a block diagram of an apparatus shown in FIG. 4, and a flowchart shown in FIG. 5.

Figure 6:
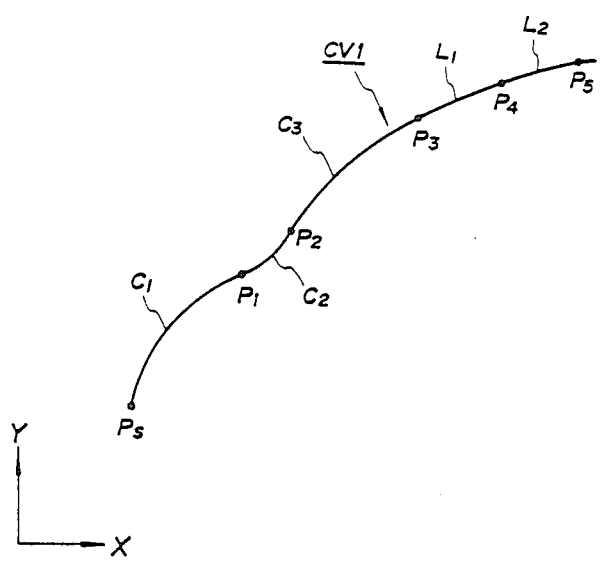
FIG. 6 is a view useful in describing a method of specifying a curve on a plane, FIGS. 7A and B indicate section and section curve data input processing according to the present invention.

(a) Projection curve data input processing (a)-1 As shown in FIG. 6, assume that the first curve $CV_1$ obtained by the projection onto the X-Y plane is composed of circular arcs $C_1$, $C_2$, $C_3$, straight lines $L_1$, $L_2 \ldots$ successively connected one to the next, that the starting and end points of each of the circular arcs $C_1$, $C_2$, $C_3$ are $(P_s, P_1)$, $(P_1, P_2)$, $(P_2, P_3)$, respectively, and that the end points of the straight lines $L_1$, $L_2$ are $P_4$, $P_5 \ldots$, and so on. In such case, the following data are fed into the three-dimensional curve generating apparatus 102 from the keyboard 101 and stored in the RAM $102a$ to specify the first curve $CV_1$:

$CV_1 = *$ $P_s(x_s, y_s);$ $C_1(r_1, x_{c1}, y_{c1})\ P_1(x_1, y_1);$ $C_2(r_2, x_{c2}, y_{c2})\ P_2(x_2, y_2);$ $C_3(r_3, x_{c3}, y_{c3})\ P_3(x_3, y_3);$ $L_1,\ P_4(x_4, y_4);$ $L_2,\ P_5(x_5, y_5);$

It should be noted that $r_i$ $(i=1, 2, 3)$ denotes the arc radius of each circular arc, $(x_{ci}, y_{ci})$ $(i=1, 2, 3)$ represent the coordinate values of the arc center of each circular arc, and $(x_i, y_i)$ $(i=1, 2, 3)$ designate the positional coordinate values of the point $P_i$.

The second curve $CV_2$ obtained by the projection on the YZ plane is similarly entered from the keyboard 101 upon being approximated by circular arcs and straight lines. Such will complete processing for entry of the projection curve data. Note that the block in the flowchart corresponding to the above process is marked at its upper right-hand corner by the symbols (a)-1. The same will hold for the other blocks as well.

(a)-2 A partitioning pitch s is entered from the keyboard 101 following entry of the first and second curve data.

(b) Partition point processing (b)-1 When the first and second curve data and the partitioning pitch have been entered, the processor $102b$, on the basis of a control program stored in the ROM $102c$, finds the length $D_i$ of each element of the first curve $CV_1$ (where the line segments $L_1$, $L_2, \ldots$ and circular arcs $C_1$, $C_2$, $C_3 \ldots$ constructing the first curve are assumed to be the elements), calculates the total of these lengths and stores the total length $D_t$ of the first curve in the working memory $102d$.

(b)-2 Thereafter, a number M of partitions is found from the length $D_t$ and partitioning pitch s by using the following equation:

$$D_t/s \rightarrow M \qquad (1)$$

It should be noted that M is an integer obtained by raising $D_t/s$ from the decimal point onward to arrive at the next higher whole number.

(b)-3 The processor $102b$ then performs the operation $0 \rightarrow i$ to initialize i. Note that the maximum value of i is (M-1).

(b)-4 The processor also finds m, n in accordance with the following expressions:

$i+1 \rightarrow m,\ M-m \rightarrow n$ (b)-5 Next, the processor $102b$ obtains the coordinate values $(a_i, b_i)$ of the partition point $P_i$ which partitions the first curve into the ratio m:n. Specifically, the processor first calculates a length $D'$ from the starting point $P_s$ to the partition point $P_i$ which partitions the first curve $CV_1$ into the ratio m:n, the calculation being performed in accordance with the following equation:

$$\begin{aligned} D' &= m \cdot D_t/(m+n) \\ &= (i+1) \cdot D_t/M \end{aligned} \qquad (2)$$

Next, an element which includes a position at a distance of the length $D'$ from the starting point Ps is extracted. To extract this element, let $D_1$ be the length of the initial element, $D_2$ the length of the next element, and so on through $D_3, \ldots, D_i, \ldots$ in like fashion. The element may then be extracted by finding k in the following expression:

$$\sum_{i=1}^{k-1} D_i \leq D' \leq \sum_{i=1}^{k} D_i \qquad (3)$$

When the k-th element has been found, the processor finds the coordinate values $(a_i, b_i)$ of the point $P_i$ on the k-th element whose distance from the starting point thereof is $D''$, where $D''$ is found from:

$$D'' = D' - \sum_{i=1}^{k-1} D_i \qquad (4)$$

The obtained point is that which partitions the given curve into the ratio m:n from one end thereof. It will be assumed that $$\sum_{i=1}^{k-1} D_i = 0$$

when $k=1$.

(c) Processing for calculating of coordinate values of $Q_i$

The process is as follows for calculating the coordinate values $(b_i, c_i)$ of the point $Q_i$ on the second curve $CV_2$ corresponding to the partition point $P_i$ on the first curve $CV_1$:

Of the coordinate values $(a_i,b_i)$ of the partition point $P_i$, we assume that $b_i$ is the coordinate value on the Y axis, which is the common axis. We then find an element which constitutes the second curve $CV_2$ and which includes a point of which the Y-axis coordinate value is $b_i$.

Letting a function specifying the element found in this manner be expressed by the following:

$$f(y, z) = 0 \qquad (5)$$

we substitute $b_i$ for y and find the Z-axis coordinate value z from the following:

$$f(b_i, z) = 0$$

Letting the Z-axis coordinate value obtained be $c_i$, $(b_i,c_i)$ will be the coordinate values of the point $Q_i$ on the second curve and corresponding to the partition point $P_i$.

(d) Processing for specifying three-dimensional curve (d)-1 $(a_i,b_i,c_i)$ obtained in step (c) are stored in the data memory 102e as coordinate values of the point $R_i$ on the three-dimensional curve.

(d)-2 The processor 102b then checks whether $i=(M-1)$ holds. If it does not, processing from step (b)-4 onward is repeated. If $i=(m-1)$ does hold, however, then processing for specifying the three-dimensional curve ends.

Thereafter, the position data $(a_i,b_i,c_i)$ for point $R_i$ stored in the data memory 102e are transferred to the curved surface generating unit 103 to end the processing for specifying and entering the three-dimensional curve.

(B) Section and section curve data input processing

Figure 7A:
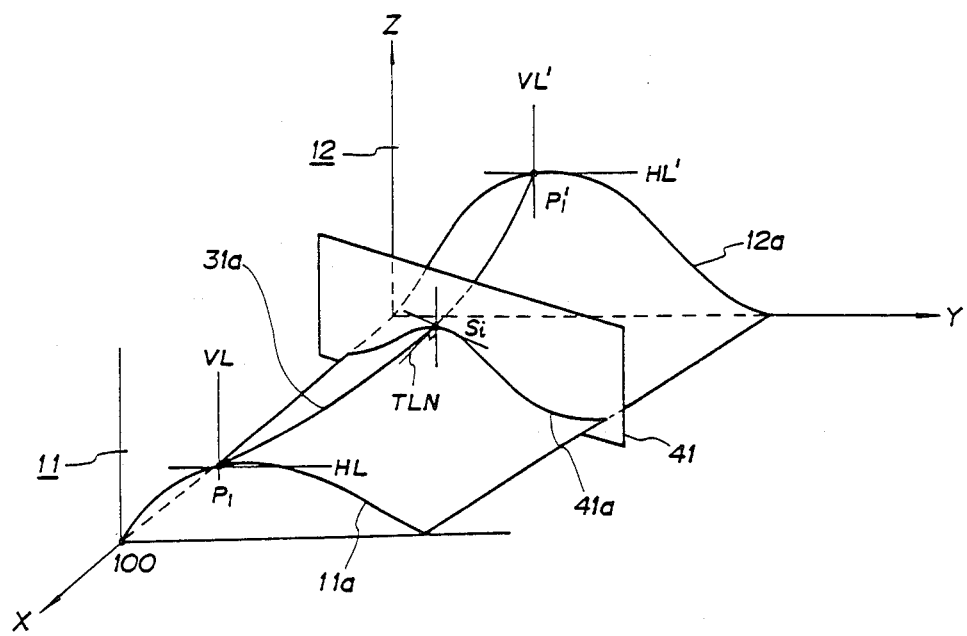
Figure 7B:
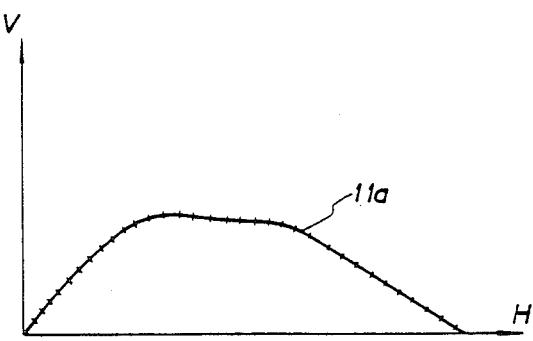

This processing includes transforming the section curve 11a in the section 11 [see for example FIG. 7(A)] into a curve on an H-V plane, as shown in FIG. 7(B), approximating the section curve 11a by a multiplicity of line elements comprising straight lines and circular arcs, and entering the starting point, end point, radius and center data for each line element from the keyboard 101 (FIG. 4) to specify the section curve 11a. As for a method of specifying the section curve 11a, refer to the above-described processing for entering the projection curve data.

Likewise, the section curve 12a in the section 12 is transformed into a curve on the H-V plane, and the section curve 12a is fed into the RAM 103a of the computerized curved surface generating unit 103 from the keyboard 101 after being approximated by a multiplicity of line elements comprising straight lines and circular arcs.

Next, let $BC_1$, $BC_2$ be the names of the sections 11, 12, respectively, and let $SC_1$, $SC_2$ represent the names of the section curves 11a, 12a, respectively. The sections 11, 12 will then be defined by the following:

$BC_1$ ($SC_1$, YZ, 100)
$BC_2$ ($SC_2$, YZ, 0)

and fed into the curved surface generating unit 103 from the keyboard 101 to be stored in the RAM 103a, as in the manner set forth above. This will end section data input processing. It is assumed that the sections 11, 12 are orthogonal to tangents to the three-dimensional curve 31a at points $P_1$, $P_2$. Further, the aforementioned section data $BC_1$ ($SC_1$,YZ,100), $BC_2$ ($SC_2$,YZ,0) indicate that the section curves $SC_1$, $SC_2$ lie in sections that are parallel to the YZ plane, and that these sections pass through $X=100$, $X=0$ on the X axis, respectively.

(C) Method of generating intermediate surface

When entry of the data specifying the three-dimensional curve 31a, sections 11, 12 and section curves 11a, 12a by the process steps (A), (B) has been completed, the processor 103b of the curved surface generating unit 103 initializes i by performing the operation $0 \rightarrow i$ under the control of a control program stored in the ROM 103c.

The processor then finds m, n by performing the following operations:

$$i+1 \rightarrow m, \quad M-m \rightarrow n$$

After execution of the calculations for m, n, the processor finds a partition point $S_i$ which partitions the length of the three-dimensional curve 31a [FIG. 7(A)] into the ratio m:n.

Figure 8:
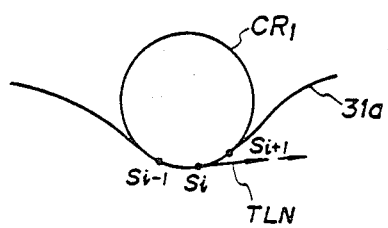
FIG. 8 is a view for describing a tangent calculation principle, FIGS. 9A, 9B, 9C and 9D indicate processing for creating a curved surface according to the present invention.

Thereafter, the processor 103b finds a tangent TLN to the three-dimensional curve 31a at the partition point $S_i$ and generates an intermediate section 41 which will be perpendicular to the tangent TLN. It should be noted that methods of calculating a tangent to a given three-dimensional curve at any point on the curve, and of calculating a plane orthogonal to the tangent, are well-known. For example, as shown in FIG. 8, if partition points $S_{i-1}$, $S_{i+1}$ which precede and follow the partition point $S_i$ by one point are found, following by obtaining a circular arc $CR_1$ passing through the three points and then a tangent vector U $(i_t,j_t,k_t)$ which contacts the circular arc $CR_1$ at the partition point $S_i$, then the tangent vector U will express the tangent TLN.

If the planar equation of the plane orthogonal to the tangent line TLN at the partition point $S_i$ is expressed by the following:

$$aX + bY + cZ = d \qquad (6)$$

(where the above equation is the general equation of a plane), then the tangent vector U $(i_t,j_t,k_t)$ will be a vector normal to the plane. Therefore, the following equation will hold:

$$i_t x + j_t y + k_t z = d \qquad (7)$$

Since the partition point $S_i(x_i,y_i,j_i)$ is located on the plane, the following equation will hold:

$$i_t x_i + j_t y_i + k_t z_i = d \qquad (8)$$

Accordingly, the intermediate section 41 orthogonal to the three-dimensional curve 31a at the partition point $S_i$ is specified by Eqs. (7) and (8).

Figures 9A, 9B:
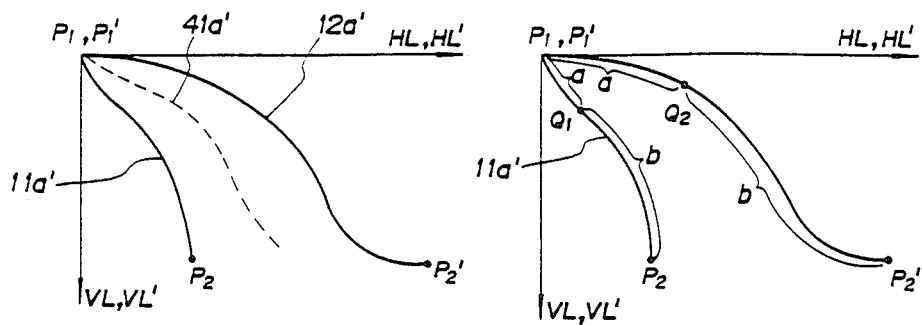

(D) Processing for generating intermediate section curve (a) When the intermediate section 41 has been found, the processor 103b transforms the section curves 11a, 12a so as to lie on a predetermined plane [FIG. 9(A)]. It should be noted that the section curves 11a, 12a can be considered to be curves on the same plane by performing the following operations (a)-1 through (a)-3:

(a)-1 The points of intersection $P_1$, $P_1'$ of the three-dimensional curve 31a and both sections 11, 12 are made the same point.

(a)-2 Line segments VL, HL are set to perpendicularly intersect each other at the intersection $P_l$, line segments VL', HL' are set to perpendicularly intersect each other at the intersection $P_1'$, and it is arranged so that the line segments VL, VL'; HL, HL' are superimposed on each other.

(b) By using the two section curves $11a'$, $12a'$ lying on the predetermined plane obtained from step (a) above, an intermediate section curve $41a'$ is generated on the predetermined plane. The intermediate section curve $41a'$ is generated through the following procedure:

(b)-1 First, the processor performs the operation $0 \rightarrow j$. Note that the maximum value of j is (N-1) if the number of partitions is N.

(b)-2 Next, a, b are found from $j+1 \rightarrow a$, $N-a \rightarrow b$.

(b)-3 Points $Q_1$, $Q_2$, which partition the lengths of the respective section curves $11a'$, $12a'$ each into a ratio of a:b (=a:N-a), are found [FIG. 9(B)].

Figures 9C, 9D:
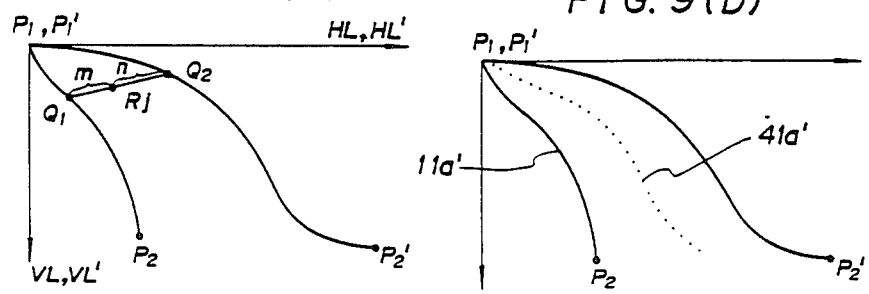

(b)-4 A partition point $R_j$ is calculated, which point partitions a line segment $Q_1Q_2$ connecting the points $Q_1$, $Q_2$ at the ratio m:n [FIG. 9(C)]. Note that the partitioning ratio m:n is that at which the partition point $S_i$ partitions the total length of the three-dimensional curve $31a$.

If we let the coordinate values of the partition points $Q_1$, $Q_2$ be $(x_1,y_1)$ and $(x_2,y_2)$, respectively, then the coordinate values (X,Y) of the partition point $R_j$ may be calculated from the following equations:

$$X = x_1 + m \cdot (x_2 - x_1)/(m+n) \tag{9}$$

$$Y = y_1 + m \cdot (y_2 - y_1)/(m+n) \tag{10}$$

(b)-5 Thereafter, the processor $103b$ checks whether n=N-1 holds. If j<(N-1) is found to hold, processing from step (b)-2 onward is repeated. Specifically, the intermediate section curve $41a'$ is generated by a series of points $R_j$ (j=1,2 ...) while the value of the partitioning ratio a:b (=a/b) of step (b)-2 is varied successively [FIG. 9(D)]. A smoother intermediate section curve $41a'$ can be obtained by making the change in the value of the partitioning ratio a/b very small.

(c)-1 If j=(N-1) in step (b)-5, the processor $103b$ converts the intermediate section curve $41a'$ on the predetermined plane found in step (b), which is thus transformed into a curve in the defined spacial intermediate section 41 [FIG. 7A]. It should be noted that the transformation formula for the transformation into the intermediate section 41 of the predetermined plane can be expressed by a combination of translational and rotational movements in space. The transformation formula generally is expressed by a matrix M shown below.

$$M = \begin{pmatrix} a_{11} & a_{12} & a_{13} & 0 \\ a_{21} & a_{22} & a_{23} & 0 \\ a_{31} & a_{32} & a_{33} & 0 \\ a_{41} & a_{42} & a_{43} & 1 \end{pmatrix}$$

where $a_{22}$, $a_{23}$, $a_{32}$, $a_{33}$ represent rotation about the X axis, $a_{11}$, $a_{13}$, $a_{31}$, $a_{33}$ rotation about the Y axis, $a_{11}$, $a_{12}$, $a_{21}$, $a_{22}$ rotation about the Z axis, $a_{41}$ translation along the X axis, $a_{42}$ translation along the Y axis, and $a_{43}$ translation along the Z axis. Accordingly, a point (x,y,z) on a predetermined plane prior to transformation is transformed into a point (X,Y,Z) on the defined spatial intermediate section 41 by multiplying the point by the transformation formula M, i.e., in accordance with the following equation:

$$(X,Y,Z,1) = (x,y,z,1) \cdot M$$

By performing the matrix transformation M for the series of points Rj (i=1,2, ...) found in step (b), the series of points Rj can be transformed into a point in defined space. The curve obtained by connecting the points in defined space, found from the matrix transformation, becomes the intermediate section curve $41a$ in the intermediate section 41.

(c)-2 When transformation processing for all points $R_j$ is completed, the processor checks whether i=(M-1) holds. If i<(M-1) is found to hold, then the foregoing process steps (C), (D) are repeated until i=(M-1) is established.

(E) Processing for repeating steps (C), (D)

If the partitioning ratio m:n is varied successively from 0:1 to 1:0, a multiplicity of intermediate section curves $41a$ will be obtained. A smooth three-dimensional curved body can be created by connecting these curves. Note that a smoother three-dimensional curved body can be obtained by making the change in the partitioning ratio m:n smaller.

Figure 4:
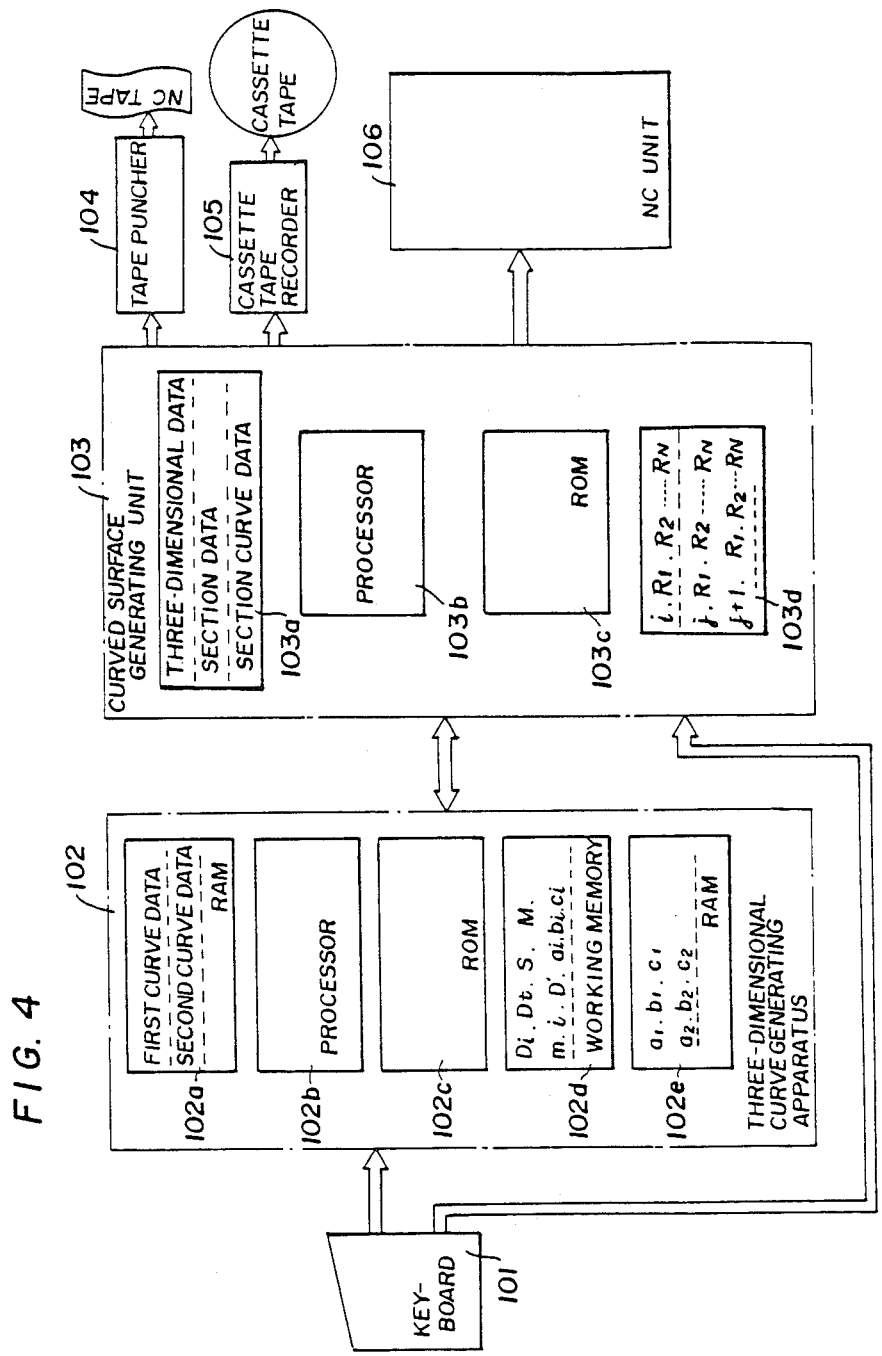
FIG. 4 is a block diagram of an apparatus for practicing the present invention.
Figure 5:
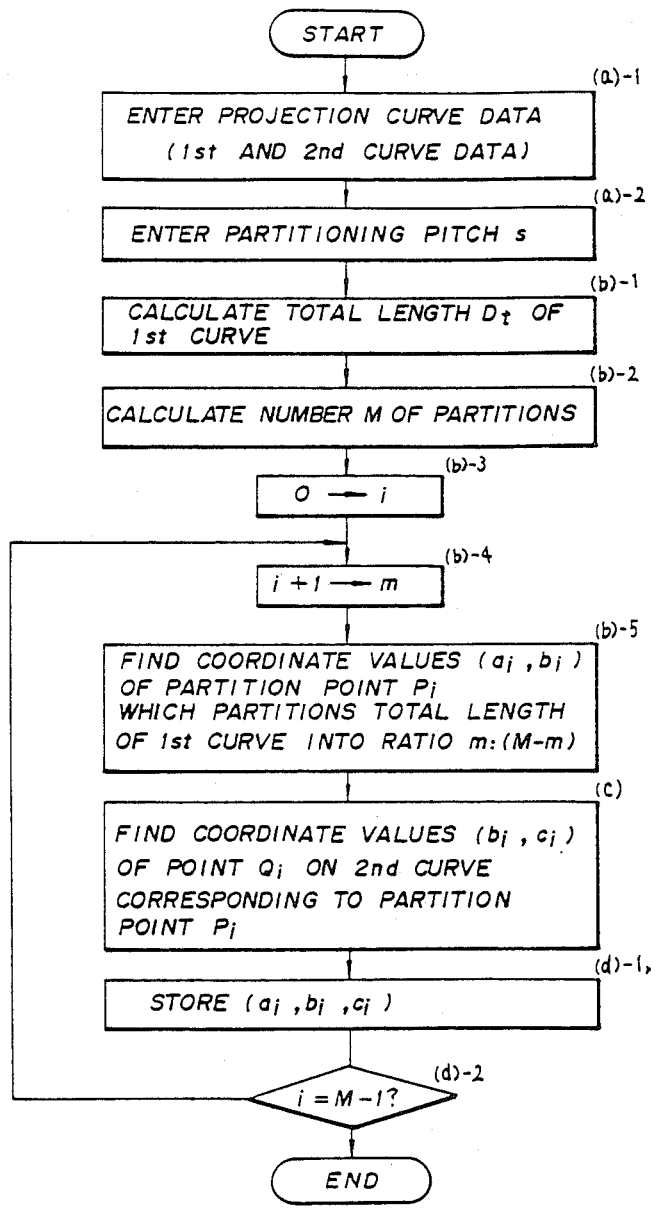
FIG. 5 is a flowchart useful in describing processing for specifying a three-dimensional curve.
Figure 11:
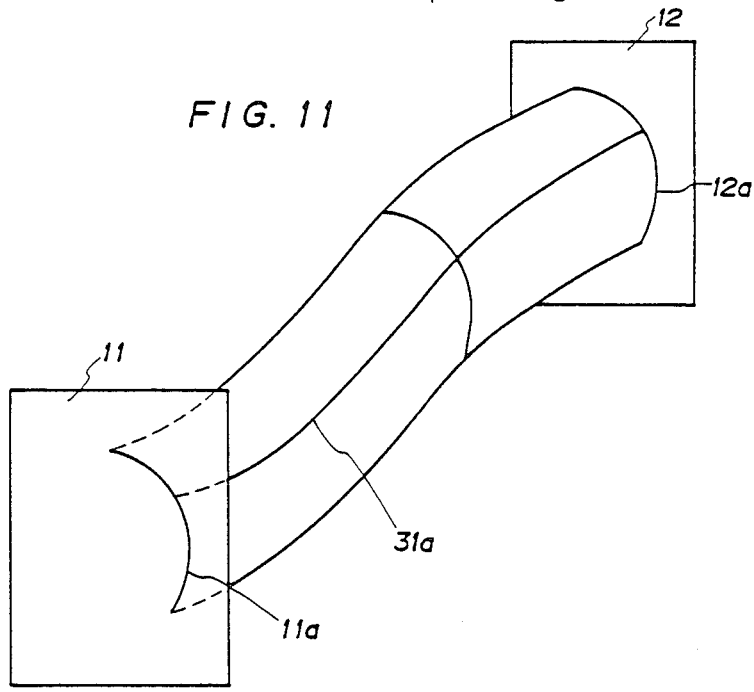
FIG. 11 is another example of a curved body created by the present invention.
Figure 10:
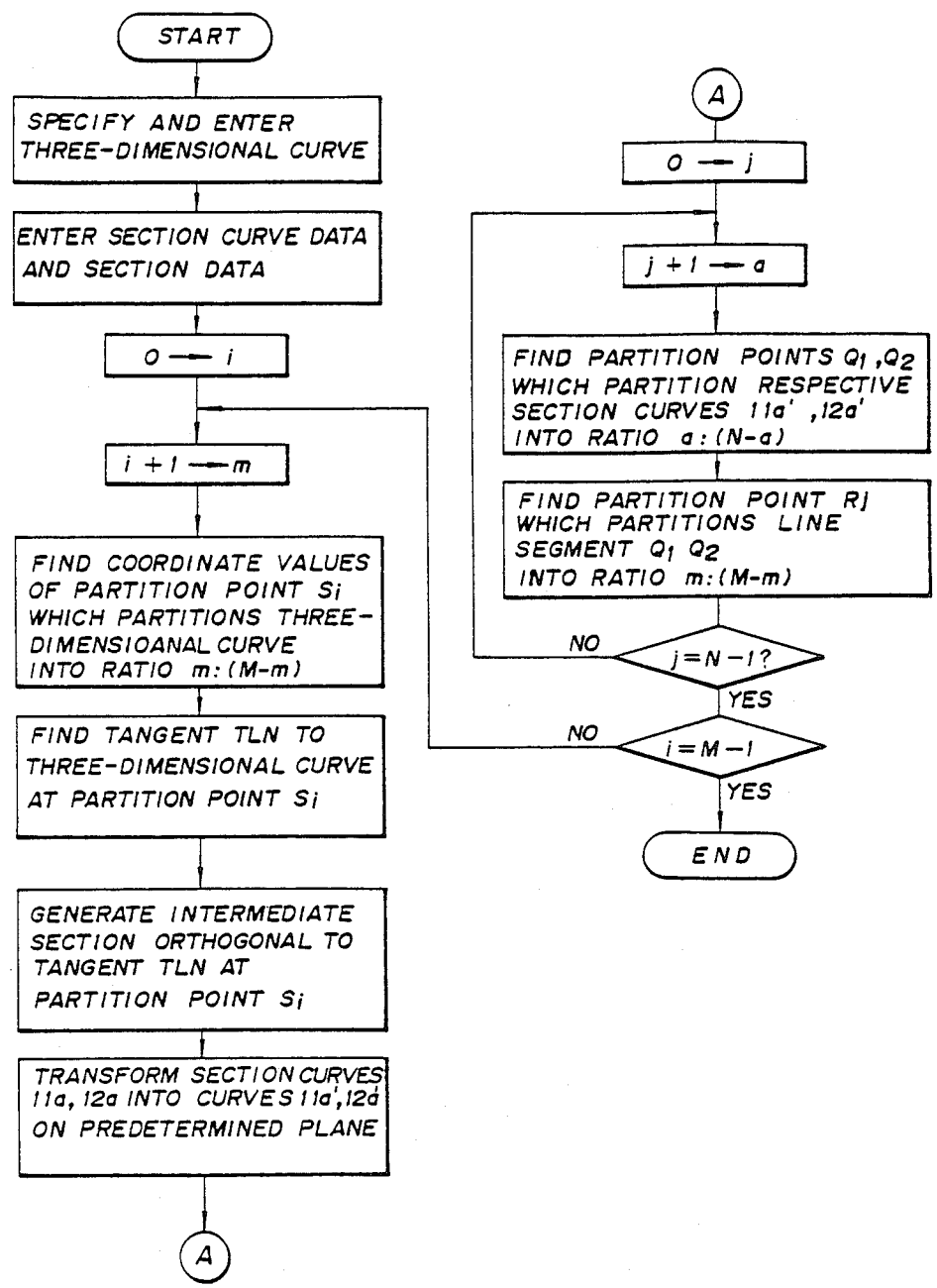
FIG. 10 is a flowchart of curved surface creation processing.

FIG. 10 is a flowchart of processing performed by the computerized curved surface generating unit 103 (FIG. 4). In accordance with the flowchart, the curved surface generating unit 103 uses the data indicative of the multiplicity of generated intermediate section curves to create NC program data in accordance with EIA or ISO codes, and delivers the data to an output unit such as a tape puncher 104 or cassette tape recorder 105 or directly to an NC unit 106 so that a machine tool is made to execute curved surface machining under the control of the NC unit. Though a case has been described where the shapes of two section curves differ, the invention is not limited thereto and can obviously be applied to a case where the section curves $11a$, $12a$ are identical in shape, as shown in FIG. 11.

According to the present invention, a three-dimensional curved body can be created by giving two section curves and a three-dimensional curve which connects predetermined points on each of the section curves. The present invention is therefore well-suited for use in creating NC program data indicative of a three-dimensional curved body having a complicated shape, or in the machining of such a three-dimensional body.

The invention claimed is:

1. A method of creating and machining a curved surface of a three-dimensional curved body on a workpiece using a curve generating apparatus, comprising:

entering, into the apparatus, section data specifying first and second sections of the three-dimensional curved body, section curve data specifying respective first and second section curves of said three-dimensional curved body for said first and second sections, and data specifying a three-dimensional curve which contains points $P_1$, $P_1'$ on the first and second section curves, respectively, and which indicates at least a part of the external shape of the three-dimensional curved body between said two sections, generating an intermediate section for each of plural partition points that partition said three-dimensional curve into a multiplicity of line elements, each intermediate section containing the respective partition point, calculating a respective intermediate section curve in each said intermediate section by using partitioning ratios of the section curve data of said two sections and position information indicative of the respective partition point of said three-dimensional curve, creating said three-dimensional curved surface with the plurality of intermediate section curves, and machining the workpiece in dependence on the three-dimensional curved surface.

2. A method of creating a curved surface according to claim 1, wherein the data specifying said three-dimensional curve are data for specifying a first projection curve and a second projection curve obtained by projecting said three-dimensional curve onto respective ones of two adjacent planes in a rectangular coordinate system.

3. A method of creating and machining a curved surface of a three-dimensional curved body, comprising:

entering, into the apparatus, section data specifying first and second sections of the three-dimensional curved body, section curve data specifying respective first and second section curves of said three-dimensional curved body for said first and second sections, and data specifying a three-dimensional curve which contains points $P_1$, $P_1'$ on the first and second section curves, respectively, and which indicates at least a part of the external shape of the three-dimensional curved body between said two sections, the data specifying said three-dimensional curve being data for specifying a first projection curve and a second projection curve obtained by projecting said three-dimensional curve onto respective ones of two adjacent planes in a rectangular coordinate system, generating an intermediate section for each of plural partition points that partition said three-dimensional curve into a multiplicity of line elements, each intermediate section containing the respective partition point, where generating of each said intermediate section including finding a tangent to the three-dimensional curve at the respective partition point, and generating, as the respective intermediate section, a plane containing the partition point and which is perpendicular to said tangent, calculating a respective intermediate section curve in each said intermediate section by using the section curve data of said two sections and position information indicative of the respective partition point on said three dimensional curve, creating said three-dimensional curved surface with the plurality of intermediate section curves, and machining the workpiece in dependence on the three-dimensional curved surface.

4. A method of creating a curved surface according to claim 3, comprising dividing said three-dimensional curve into a ratio m:m and determining each said partition point by varying the partition ration m:n.

5. A method of creating a curved surface according to claim 3, comprising finding coordinate values $(a_i,b_i)$ of each of a plurality of partition points which partition said first projection curve into a ratio m:n for a respective plurality of values for said ratio, finding coordinate values $(b_i,c_i)$ of each respective point on the second projection curve having the coordinate value $b_i$ on a common axis among the coordinate axes of said two adjacent planes, and threating $(a_i,b_i,c_i)$ as coordinate values of each of respective partition points which internally divide the three-dimensional curve for generating each respective intermediate section and for calculating each respective intermediate section curve.

6. A method of creating a curved surface according to claim 4, wherein said calculating of each said intermediate section curve includes transforming each of said intermediate section curves into a curve in a predetermined planar coordinate system in such a manner that said first and second section curves are superposed so that said points of intersection $P_1$, $P_1'$ between each of said first and second sections and the three-dimensional curve coincide, calculating a point $R_j$ on the respective intermediate section curve by internally dividing at division points $Q_1$, $Q_2$ each of said first and second section curves transformed into respective curves in said predetermined planar coordinate system into a ratio a:b, and internally dividing a straight line connecting said division points $Q_1$, $Q_2$ into said partitioning ratio m:n, and transforming the respective intermediate section curve in said predetermined planar coordinate system into the respective intermediate section curve in the respective intermediate section.

7. The method of claim 5, wherein each said ratio m:n of said partition points of said first projection curve is assumed to be the same as said respective partition points of said three-dimensional curve, and each respective ratio m:n is used for generating the respective intermediate section and calculating the respective intermediate section curve.

* * * * *

UNITED STATES PATENT AND TRADEMARK OFFICE
CERTIFICATE OF CORRECTION

PATENT NO. : 4,755,927

DATED : July 5, 1988

INVENTOR(S) : Hajimu Kishi and Masaki Seki

It is certified that error appears in the above-identified patent and that said Letters Patent is hereby corrected as shown below:

Col. 1, line 34, "see" should read -- (see --.

Col. 5, line 66, "$P_2$" should be --$P_1'$--.

Col. 10, line 7, "m:m" should be --m:n--.

Signed and Sealed this

Eighth Day of November, 1988

*Attest:*

DONALD J. QUIGG

*Attesting Officer*    *Commissioner of Patents and Trademarks*